June 19, 1962 E. N. MITCHELL 3,039,891

METHOD OF TREATING Ni-Fe THIN METAL FILM OR BODY OF MAGNETIC MATERIAL BY SUBJECTING TO HEAT TREATMENT IN A MAGNETIC FIELD ORIENTED TRANSVERSELY TO THE PREFERRED AXIS OF MAGNETIZATION

Filed Nov. 14, 1957

INVENTOR
EARL N. MITCHELL

BY: Cushman, Darby & Cushman

ATTORNEYS

United States Patent Office 3,039,891

Patented June 19, 1962

3,039,891

METHOD OF TREATING Ni-Fe THIN METAL FILM OR BODY OF MAGNETIC MATERIAL BY SUBJECTING TO HEAT TREATMENT IN A MAGNETIC FIELD ORIENTED TRANSVERSELY TO THE PREFERRED AXIS OF MAGNETIZATION

Earl N. Mitchell, St. Paul, Minn., assignor to Sperry Rand Corporation, New York, N.Y., a corporation of Delaware

Filed Nov. 14, 1957, Ser. No. 696,520
6 Claims. (Cl. 117—107)

This invention relates to treatment of magnetic material, for example, thin ferromagnetic films such as those suitable for use as storage or switching elements in digital computing apparatus, and more generally to a process or method of treating said materials in order to control their magnetic anisotropy characteristics.

Magnetic materials particularly in the form of films suitable for use in data processing and computing equipment preferably are prepared by evaporating a suitable ferromagnetic alloy in a vacuum and condensing the evaporation products on a substrate under the influence of an orienting magnetic field. The resulting film exhibits magnetic anisotropy with respect to an axis perpendicular to the plane of the film. The direction along which the orienting field is applied during the deposition process becomes the preferred or "easy" direction of magnetization while the direction in the plane of the film orthogonal to the easy direction becomes the so-called transverse or difficult direction of magnetization.

Ferromagnetic material elements usually referred to as "cores," having quasirectangular hysteresis loop characteristics are well known in the computing arts. These cores, because of their two stable states of remanent magnetization are readily adaptable to systems employing binary logic. In order to switch a core from a first remanent state to its other stable state a field is applied in one direction and in order to revert the core to its original state a reverse field is applied in the opposite direction.

Another method of reversing the remanent state of an element or core of the thin film type uses the so-called rotational switching technique. This method makes use of a magnetic field applied in the transverse direction in conjunction with a magnetic field in the preferred direction to apply a torque action on the regions of magnetic domain thereby creating a substantial decrease in the time required to reverse the remanent state of a core. When a change of field $\Delta H_T$ is applied to the film in the transverse or difficult direction, the corresponding change or increment in magnetic flux density is termed $\Delta B$. The permeability of the material in the transverse direction is then defined as the ratio $\Delta B/\Delta H_T$, hereinafter termed the transverse permeability.

It has now been discovered that particularly the thin films prepared using the vacuum deposition technique or other techniques such as chemical decomposition or electro-deposition are characterized by a substantial variation of transverse permeability among samples. Also it was found that the transverse permeability can be increased or decreased in value by the annealing method according to the present invention hereinafter described.

Since, for a given change in the longitudinal field, the transverse field necessary to cause a core to switch by rotation varies inversely with the transverse permeability of the core material, a method of increasing said permeability enhances the switching properties of a system using these cores. Also, to insure proper operation of a computing system it is of extreme importance to maintain precise level and timing of signals. Therefore it is necessary to reduce the variation of transverse permeability between the plurality of cores or film elements used in the memory of the system so that the switching time of each core is approximately the same.

It is accordingly the primary object of the present invention to provide a method whereby the transverse permeability of ferromagnetic materials is increased, particularly films produced by a vacuum deposition process.

In the annealing process of my invention, the piece of magnetic material is subjected to an elevated temperature in the presence of a magnetic field, preferably in a non-oxidizing environment, i.e., either inert or reducing. It has been found that by proper orientation of the magnetic field during the anneal, the transverse permeability of the magnetic material can be made to increase or decrease as desired.

Another object of this invention in conjunction with the foregoing object is to alter the transverse permeability of several magnetic elements by means of a low temperature annealing process in the presence of a suitably oriented magnetic field so as to yield elements exhibiting very little variation in the transverse permeability characteristic.

Still other objects of this invention will become apparent to those of ordinary skill in the art by reading the following detailed description of the exemplary embodiments of the invention and the appended claims. The various features of the exemplary embodiments according to the invention may best be understood with reference to the accompanying drawings, wherein:

Figures 3A, 3B, 3C, 3D:
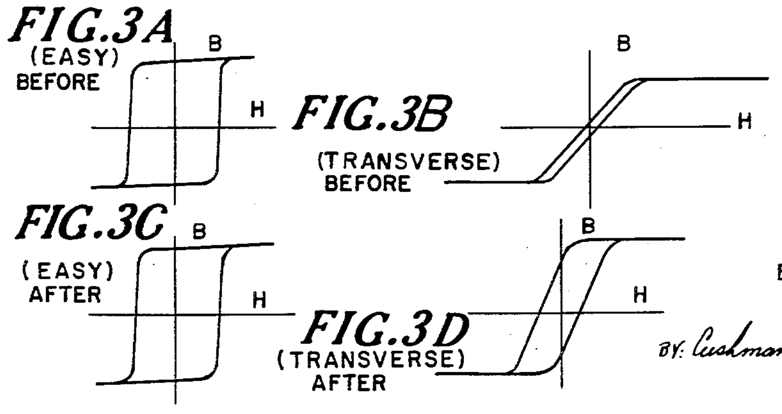

FIGURE 3*a* shows the shape of the hysteresis loop of a ferromagnetic element in the easy direction before the specimen is annealed;

FIGURE 3*b* shows the shape of the hysteresis loop of a ferromagnetic element in the difficult or transverse direction before the specimen is annealed; and FIGURE 3*c* shows the shape of the hysteresis loop of the same element in the easy direction after annealing;

FIGURE 3*d* shows the shape of the hysteresis loop of the same element in the transverse direction after annealing.

Annealing magnetic materials in the presence of an orienting field is an established art. However, as far as is known, my process is the first of its kind to use low temperature annealing (below around 175° C.) and a suitably oriented field to treat the transverse permeability of a material after manufacture. In prior art annealing techniques, the specimen is raised in temperature to approximately 600° C. and allowed to cool at a predetermined rate under the influence of a magnetic field for the purpose of changing the easy direction of magnetization. Also, temperature cycling of permanent magnets used in electric meters and the like to stabilize the instruments so as to insure the greatest possible constancy is totally unrelated to my process.

Figure 1:
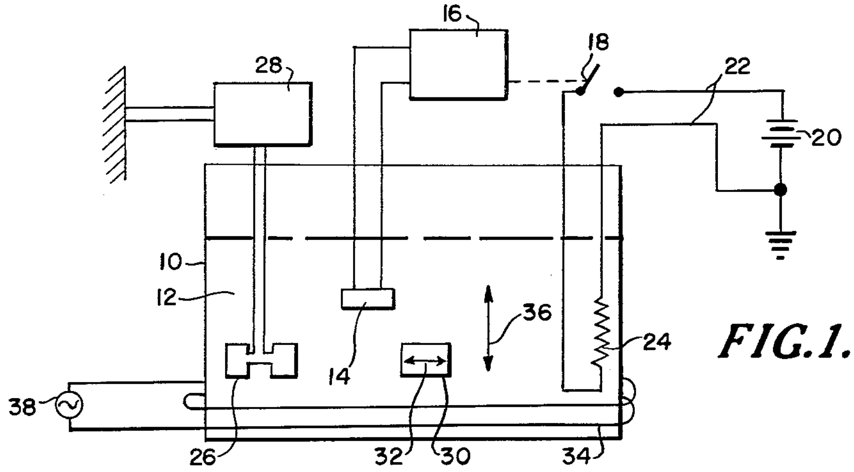
FIGURE 1 illustrates diagrammatically the apparatus used in the annealing process.

Referring now to FIGURE 1, there is shown a container 10 made of a non-magnetic material such as glass. Within the container is a non-oxidizing substance 12 for example a silicone oil bath or a reducing agent such as hydrogen. Within the bath is located a suitable temperature sensing element 14 which is electrically connected to a temperature control unit 16 which causes switch contact 18 to open or close depending on the temperature recorded by the sensing element 14. This element is preferably a thermocouple type device, but other apparatus can be used. The switch 18, when closed, allows current to flow from potential source 20, through lines 22 to a heating element 24. To insure an even distribution of temperature in the solution, an agitator 26, driven by motor 28 is used to keep the fluid bath in circulation. Any deviation of the temperature from a preset value causes the switch 18 to open and close depending on the direction of the temperature change.

Within this controlled environment is located the magnetic material 30 to be annealed. This material is placed in a vertical plane having the longitudinal or easy axis of magnetization indicated by vector 32 in a horizontal direction. An induction coil 34 is wrapped around the non-magnetic container to provide a relatively strong magnetic field in the vertical direction indicated by vector 36 which is therefore orthogonal to the preferred direction of magnetization. The excitation source 38 for the induction coil can be either an alternating or direct current source, however an alternating source is preferred since the application of a direct current in the transverse direction during the annealing process tends to shift the original easy direction of magnetization which in some cases may be undesirable.

The coil 34 is supplied with sufficient current to completely saturate the magnetic material in the transverse direction. It has been found that a field of 30 oersteds is sufficient for all cases to insure complete saturation. However, limitation to this field strength is not intended.

Figure 2:
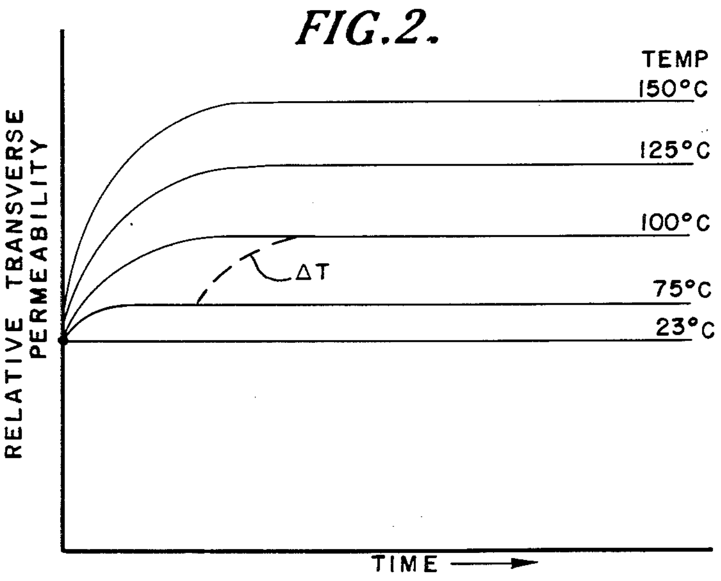
FIGURE 2 represents a family of curves showing the variation of relative transverse permeability with time duration of anneal for a series of constant temperatures levels.

The family of curves illustrated in FIGURE 2 show the variation of the relative transverse permeability of the magnetic material with time for a series of discrete constant temperature levels and an applied field of 30 oersteds. The quantity plotted along the ordinate axis is the inverse of the field strength needed for saturation in the transverse direction. Since the magnetic material is in a saturated condition, there is very little change in flux density for a large change in field strength and therefore said field strength is inversely proportional to the transverse permeability of the material. It can be seen from these curves that in the range of useable annealing temperatures (below around 175° C. for a specimen as hereinafter described), an increase of temperature will cause an increase in the magnitude of the transverse permeability. For a film composed of 82% Ni and 18% Fe Permalloy and of shape and mass as hereinafter described, as the annealing temperature is increased beyond a critical temperature around 175° C. the easy direction of the material is changed and the film no longer has a rectangular hysteresis loop along a new direction. From experiments performed on the films, this critical temperature appears to be a function of the shape, mass, and the type of magnetic material and is well below the Curie point of the substance.

Although there is no adequate theory which will explain the degradation of the hysteresis loop above a certain critical temperature, from a thermodynamic standpoint, the thermal energy introduced in the film is assumed sufficient to allow the anisotropy of the film to be changed by the annealing field.

It has also been observed that below temperatures of around 50° C. the annealing process has little or no effect on the relative transverse permeability. Again from a thermodynamic standpoint, this may be due to the fact that an insufficient amount of thermal energy is introduced into the system to in any way allow the system to be perturbed by the annealing field. Again this lower critical temperature appears to be a function of the shape, mass, and type of magnetic material.

The family of curves of FIGURE 2 shows that continuous treatment of a magnetic film at a predetermined temperature and applied magnetic field will produce a maximum transverse permeability after which further continued treatment has no further effect. If a magnetic film, treated at a given temperature, has reached its maximum permeability for that temperature, a subsequent increase in temperature will cause a further increase in the transverse permeability as shown by curve $\Delta T$.

The results of the low temperature annealing are permanent in nature in that the film when removed from the apparatus of FIGURE 1 does not revert back to its original condition before the anneal. It has been found that the anneal is not a completely reversible process in that the transverse permeability of the ferromagnetic film cannot be restored to its original value even under the influence of a magnetic field oriented at right angles to the direction of the annealing field.

It has been found that the low temperature annealing method of this invention can be used to substantially reduce the variation of transverse permeability among several film samples. It has been shown above that a heat treatment in the presence of a magnetic field oriented in the difficult direction can be used to increase the transverse permeability of a magnetic material. If it should become necessary to decrease the transverse permeability of a film sample subsequent to increasing the permeability by the above process the same annealing technique can be used, only in this case the annealing field should be oriented in the easy direction of magnetization. This can be done by rotating the magnetic material 30 of FIG. 1 by 90 degrees so that the longitudinal or easy direction of magnetization lies in a vertical axis, i.e., aligned with the vector 36.

An example of procedure including the present invention was as follows: In accordance with the teachings in the copending application of Sidney M. Rubens, Serial No. 599,100, filed July 20, 1956, now Patent No. 2,900,282, assigned to the assignee of the present invention, a magnetic material specimen for treatment according to the present invention was prepared by providing a smooth glass substrate material first washed in a detergent such as Alconox and then rinsed thoroughly in distilled water and again washed in a solution of potassium dichromate and sulphuric acid. After the substrate was chemically cleaned, it was again rinsed in distilled water, dried and any remaining dust particles were removed by a static-less bristle brush. The substrate was then placed in a mask which was clamped to a substrate heater. The mask was configured to create a specimen having a diameter of 1 centimeter. About 24 grams of a melt consisting essentially of 82% nickel and 18% iron were placed in a crucible within a work coil and a bell jar was placed thereover and sealed and evacuated to a pressure of about $10^{-5}$ millimeters of mercury. The substrate was heated to approximately 400° C. and then reduced to 300° C. to be certain that the substrate was absolutely clean in the area where the specimen was formed. The melt was then heated to about 1600° C. while a magnetic field produced by a permanent magnet was maintained at about 92 oersteds, with the position of the intended specimen located therein. A gate over the opening in the mask was held closed for a few minutes to avoid the effects of greater fractional distillation as evaporation first started. The gate was then opened, with evaporation occurring at the rate of about 2400 Angstrom units per minute. Evaporation was continued until a monitor slide apparatus indicated a resistance of the specimen corresponding to a thickness of 3800 Angstrom units, whereupon the gate was closed. The resulting film specimen was 1 centimeter in diameter, 3800 Angstrom units thick, and composed of 82% nickel and 18% iron, as aforesaid. This specimen was allowed to cool.

Following the preparation of the specimen as aforesaid, same was placed in the annealing apparatus as described hereinabove and was maintained therein at a temperature of 75° C. for 20 hours with a magnetic field in the transverse direction applied in strength of 30 oersteds. The specimen was then permitted to cool. By subsequent experimentation it was found that the field strength needed to saturate the aforesaid specimen in the transverse direction was 2.83 oersteds. The figure needed to saturate this specimen before the annealing process according to this invention was 3.17 oersteds.

In another example, a specimen prepared as in the first example was subjected to the annealing method of the present invention by maintaining same in the non-oxidizing surroundings according to the above described illustrative embodiments of the present invention for a period of 30 hours at a temperature of 125° C. in a field in the transverse direction of 30 oersteds. In this case the field necessary for saturation in the transverse direction before said annealing step was 2.36 oersteds, while after the annealing process it was 2.03 oersteds.

For several specimens substantially as in the preceding examples, it was experimentally determined that before annealing, the field strength, needed to saturate the material in the transverse direction for several samples varied between 3.6 oersteds and 6.2 oersteds. After the annealing process, the variation of the same group was found to be from 1.9 oersteds to 2.5 oersteds, which is an improvement of around 23%.

FIGURES 3*a*, 3*b*, 3*c*, and 3*d* show the effect of the low temperature anneal on the shape of the hysteresis loop of a typical deposited film. FIGURES 3*a* and 3*b* illustrate the shape of the loop before the material was annealed as observed in the easy and transverse directions respectively. FIGURES 3*c* and 3*d* show the corresponding loop waveforms as observed after the film was annealed. It can be seen immediately that there is no observable change in the shape of the hysteresis loop in the easy direction when the annealing field is oriented in the transverse direction during the heat treatment. There is, however, an appreciable change in the shape of the loop in the transverse direction as a result of the annealing process. The increase in transverse permeability is readily apparent from the increase in the slope of the hysteresis loop between the two states of positive and negative saturation. There is also an observable increase in the hysteresis energy loss in the material as indicated by the broadening of the hysteresis loop.

Since the anisotropy field i.e., the field required to rotate the magnetization from the easy to the difficult direction, varies inversely with the transverse permeability, and increase in transverse permeability results in a corresponding increase in the speed of switching from one stable state to the other for the same applied transverse field, and this results in improved performance with the expenditure of less power.

It can be seen therefore that there is provided by the process of the invention a means whereby the transverse permeability of a ferromagnetic element or film can be increased in order to reduce the switching time of said element or decreased should it become necessary.

Other modifications and applications of this invention not described herein will become apparent to those of ordinary skill in the art after reading this disclosure. Therefore it is intended that the material contained in the foregoing description and accompanying drawings be construed as illustrative, the scope of the invention being defined in the appended claims.

What is claimed is:

1. The method of treating a body of magnetic material consisting essentially of an alloy of nickel and iron wherein the composition includes about 82% nickel, balance iron, and wherein said body has preferred directions of remanent magnetization lying along a certain magnetic axis thereof, said method comprising the steps of subjecting said body to a magnetic field oriented substantially transversely to said magnetic axis while said body is maintained at a temperature in a range of between about 50° C. and 175° C.

2. The method as defined in claim 1 being particularly characterized in that said body of magnetic material is an evaporatively deposited thin film arranged along the surface of a substrate body.

3. The method of claim 2 being particularly characterized in that said body is of the order of 1 cm. in diameter, of the order of 3800 Angstrom units in thickness, and wherein the said magnetic field is approximately 30 oersteds in strength.

4. The method of treating a thin film of magnetic material arranged along the surface of a substrate, said film consisting essentially of an alloy of nickel and iron wherein the composition includes about 82% nickel, balance iron, and wherein said film has preferred directions of remanent magnetization lying along a certain magnetic axis thereof, said method comprising the steps of annealing said film by applying a magnetic field along an axis which is substantially transverse to said magnetic axis for a period of time, removing said field, and applying a second magnetic field to said film substantially along said magnetization axis for a period of time sufficient to decrease the permeability along an axis which is substantially transverse to said magnetic axis, said fields being applied while said film is maintained at a temperature lying within a range between about 50° C. and 175° C.

5. The method of claim 4 being particularly characterized in that said first magnetic field substantially saturates said film along said transverse axis.

6. The method as defined in claim 5 being particularly characterized in that said method is carried out in a substantially non-oxidizing environment.

References Cited in the file of this patent

UNITED STATES PATENTS

| | | |
|---|---|---|
| 2,792,563 | Rajchman | May 14, 1957 |
| 2,853,402 | Blois | Sept. 23, 1958 |
| 2,900,282 | Rubens | Aug. 18, 1959 |

FOREIGN PATENTS

| | | |
|---|---|---|
| 670,993 | Great Britain | Apr. 30, 1952 |

OTHER REFERENCES

Sowter: Institute of Electrical Engineers, vol. 98, No. 61, pp. 5–8 (February 1951).

Blois: "Journal of Applied Physics," vol. 26, No. 8, August 1955, pp. 975–980, page 980 relied on.

Williams et al.: "Journal of Applied Physics," vol. 28, No. 5, May 1957, pp. 548–555, pp. 549 and 555 relied on.